United States Patent
Itoh

(10) Patent No.: US 11,409,761 B2
(45) Date of Patent: Aug. 9, 2022

(54) VEHICLE DATA MANAGEMENT DEVICE, VEHICLE DATA MANAGEMENT SYSTEM, AND METHOD OF MANAGING VEHICLE DATA

(71) Applicant: DENSO CORPORATION, Kariya (JP)

(72) Inventor: Masaya Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/186,022

(22) Filed: Feb. 26, 2021

(65) Prior Publication Data

US 2021/0279250 A1    Sep. 9, 2021

(30) Foreign Application Priority Data

Mar. 3, 2020    (JP) .............................. JP2020-035755

(51) Int. Cl.
*G06F 16/25*    (2019.01)
*G06F 16/28*    (2019.01)
*H04W 4/48*    (2018.01)

(52) U.S. Cl.
CPC .......... *G06F 16/258* (2019.01); *G06F 16/285* (2019.01); *H04W 4/48* (2018.02)

(58) Field of Classification Search
CPC ....... G06F 16/258; G06F 16/285; H04W 4/48
USPC ....................................................... 707/756
See application file for complete search history.

(56) References Cited

U.S. PATENT DOCUMENTS

| 2013/0238670 | A1 | 9/2013 | Amirpour et al. | |
| 2015/0325062 | A1 | 11/2015 | Mason et al. | |
| 2017/0134164 | A1 | 5/2017 | Haga et al. | |
| 2017/0330391 | A1* | 11/2017 | Uno | G07C 5/008 |
| 2018/0233042 | A1* | 8/2018 | Zhang | G08G 1/096791 |
| 2021/0356279 | A1* | 11/2021 | Szigeti | G06Q 30/0639 |
| 2022/0046114 | A1* | 2/2022 | Entelis | H04L 69/04 |

FOREIGN PATENT DOCUMENTS

JP    6020611 B2    11/2016

* cited by examiner

*Primary Examiner* — Dung K Chau
(74) *Attorney, Agent, or Firm* — Harness, Dickey & Pierce, P.L.C.

(57) ABSTRACT

A vehicle data management device includes a data acquisition unit and a data conversion unit. The data acquisition unit is configured to acquire, from each of a plurality of in-vehicle devices mounted on a corresponding vehicle of a plurality of vehicles, a vehicle identification information that is set based on at least a model of the vehicle, and a first data that is contained in a communication frame and is indicative of a vehicle information. The data conversion unit is configured to convert the first data into a label and a second data based on a conversion map that contains a label identification information for identifying the label corresponding to the first data, and a conversion information for converting the first data into the second data. The conversion map contains at least one label identification information and at least one conversion information for each vehicle identification information.

7 Claims, 9 Drawing Sheets

FIG. 6

| i | VEHICLE ID | TIME | LATITUDE | LONGITUDE | SYSTEM | CANID | CAN DATA |
|---|---|---|---|---|---|---|---|
| 1 | 012 | 2019/10/17 12:34:56.1234 | 34.5678 | 137.1234 | CAN1 | 123 | |
| 2 | 012 | 2019/10/17 12:34:56.1234 | 34.5678 | 137.1234 | CAN1 | 7FE | |
| 3 | 012 | 2019/10/17 12:34:56.1234 | 34.5678 | 137.1234 | CAN2 | 311 | |
| ... | ... | ... | ... | ... | ... | ... | ... |
| | 890 | 2019/10/17 12:34:56.1234 | 34.5678 | 137.1234 | CANa | 233 | |
| | 890 | 2019/10/17 12:34:56.1234 | 34.5678 | 137.1234 | CANa | 4a1 | |
| | 890 | 2019/10/17 12:34:56.1234 | 34.5678 | 137.1234 | CANb | 68E | |
| n | ... | ... | | | | ... | ... |

| VEHICLE ID | TIME | LATITUDE | LONGITUDE | SYSTEM | CONTROL LABEL | VEHICLE INFORMATION |
|---|---|---|---|---|---|---|
| 012 | 2019/10/17 12:34:56.1234 | 34.5678 | 137.1234 | POWERTRAIN | ENGINE SPEED | 4567rpm |
| 012 | 2019/10/17 12:34:56.1234 | 34.5678 | 137.1234 | POWERTRAIN | ACCELERATOR OPEN DEGREE | 50% |
| 012 | 2019/10/17 12:34:56.1234 | 34.5678 | 137.1234 | POWERTRAIN | SHIFT POSITION | D-RANGE |
| 012 | 2019/10/17 12:34:56.1234 | 34.5678 | 137.1234 | BODY | HEADLIGHT | HIGH BEAM |
| .... | ... | ... | ... | ... | ... | ... |
| 890 | 2019/10/17 12:34:56.1234 | 34.5678 | 137.1234 | POWERTRAIN | ENGINE SPEED | 3333rpm |
| 890 | 2019/10/17 12:34:56.1234 | 34.5678 | 137.1234 | POWERTRAIN | SHIFT POSITION | D-RANGE |
| 890 | 2019/10/17 12:34:56.1234 | 34.5678 | 137.1234 | BODY | HEADLIGHT | LOW BEAM |
| .... | ... | ... | ... | ... | ... | ... |

33b

VEHICLE DATA MANAGEMENT DEVICE, VEHICLE DATA MANAGEMENT SYSTEM, AND METHOD OF MANAGING VEHICLE DATA

CROSS REFERENCE TO RELATED APPLICATION

This application is based on and incorporates herein by reference Japanese Patent Application No. 2020-035755 filed on Mar. 3, 2020.

TECHNICAL FIELD

The present disclosure relates to a vehicle data management device, a vehicle data management system, and a method of managing vehicle data.

BACKGROUND

A remote data collection system for getting vehicle data into a center through wireless communication is known.

SUMMARY

When the vehicle data acquired through the wireless communication is accumulated as it is, different identification numbers may be added to the vehicle data of the same type (e.g. vehicle speed data, engine speed data) due to the differences between the specifications of the vehicle models or the vehicle manufacturers, and accordingly the data may be treated as data of different types.

When the vehicle data is collected from vehicles on the scale of millions to tens of millions, the data collection target vehicles vary in specification, the year model, the manufacturer, and the like. Accordingly, if the vehicle data is classified based on the specifications, the model year, and the like, the database may become complicated, and the vehicle data of the same type may not be treated as the same type data.

A vehicle data management device according to a first aspect includes a data acquisition unit and a data conversion unit. The data acquisition unit is configured to acquire, from each of a plurality of in-vehicle devices mounted on a corresponding vehicle of a plurality of vehicles, a vehicle identification information that is set based on at least a model of the vehicle, and a first data that is contained in a communication frame transmitted and received in an in-vehicle network of the vehicle and is indicative of a vehicle information relating to the vehicle. The data conversion unit is configured to convert the first data into a label and a second data that is a physical value or a type value based on a conversion map that contains a label identification information for identifying the label corresponding to the first data, and a conversion information for converting the first data into the second data. The conversion map contains at least one label identification information and at least one conversion information for each vehicle identification information.

A vehicle data management system according to a second aspect includes a vehicle data management device, at least one map storage device, and an analysis device. The data acquisition unit is configured to acquire, from each of a plurality of in-vehicle devices mounted on a corresponding vehicle of a plurality of vehicles, a vehicle identification information that is set based on at least a model of the vehicle, and a first data that is contained in a communication frame transmitted and received in an in-vehicle network of the vehicle and is indicative of a vehicle information relating to the vehicle. The data conversion unit is configured to convert the first data into a label and a second data that is a physical value or a type value based on a conversion map that contains a label identification information for identifying the label corresponding to the first data, and a conversion information for converting the first data into the second data. The conversion map contains at least one label identification information and at least one conversion information for each vehicle identification information. The at least one map storage device stores the conversion map. The analysis deice is configured to analyze the vehicle using the label and the second data converted by the vehicle data management device. The at least one map storage device and the vehicle data management device are communicably connected with each other.

According to a third aspect, a method of managing vehicle data includes: acquiring a vehicle identification information and a first data from each of a plurality of in-vehicle devices mounted on a corresponding vehicle of a plurality of vehicles, the vehicle identification information being set based on at least a model of the vehicle, the first data being indicative of a vehicle information relating to the vehicle and being contained in a communication frame transmitted and received in an in-vehicle network of the vehicle; and converting the first data into a label and a second data that is a physical value or a type value based on a conversion map that contains a label identification information for identifying the label corresponding to the first data and a conversion information for converting the first data into the second data, the conversion map containing at least one label identification information and at least one conversion information for each vehicle identification information.

BRIEF DESCRIPTION OF THE DRAWINGS

FIG. 6 is a diagram illustrating a pre-conversion database.

FIG. 8 is a diagram illustrating a post-conversion database.

DETAILED DESCRIPTION

Figure 1:
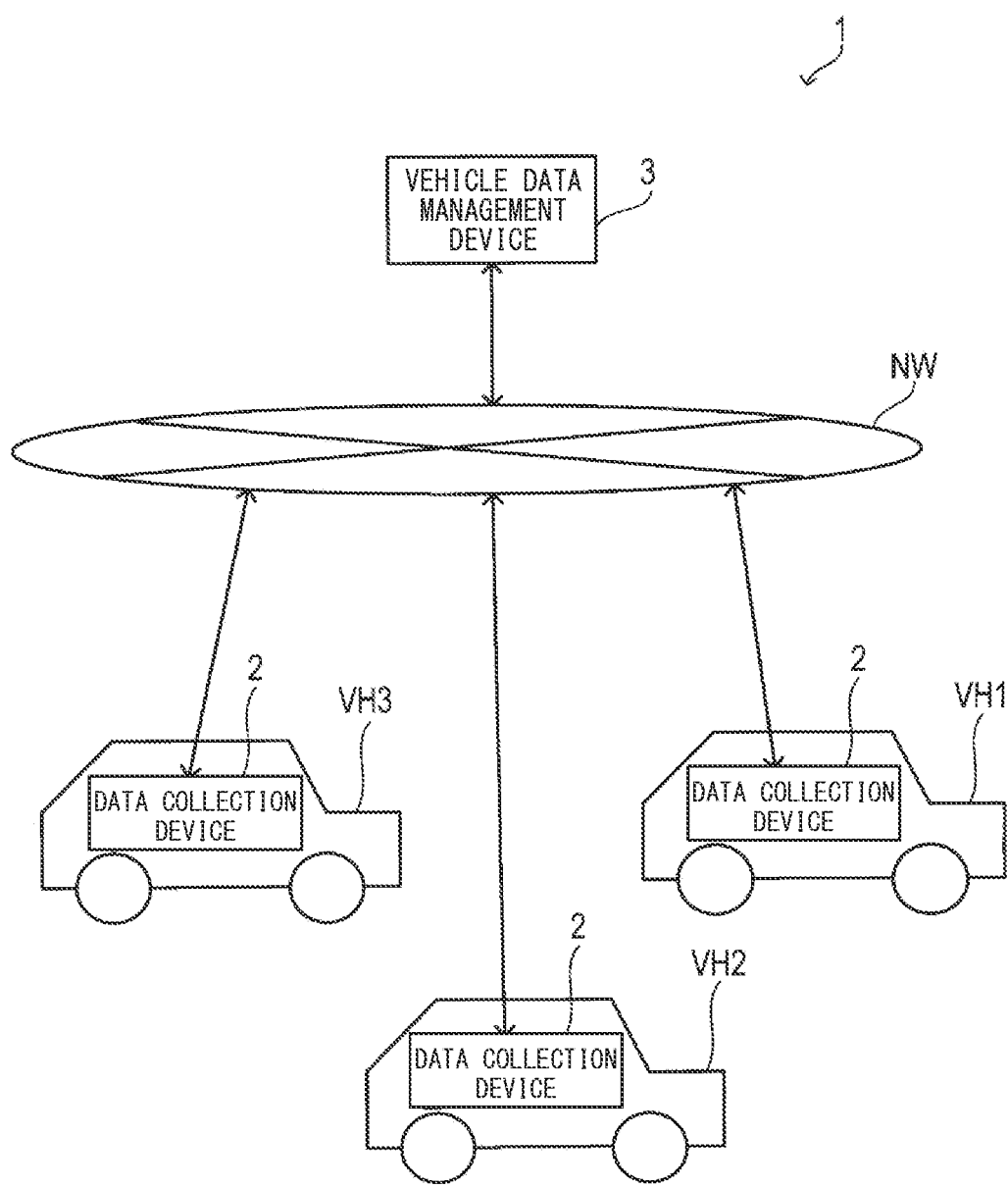
FIG. 1 is a block diagram illustrating a vehicle data management system.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Hereinafter, a first embodiment of the present disclosure will be described with reference to the drawings. A vehicle data management system 1 of the present embodiment includes multiple data collection devices 2 and a vehicle data management device 3, as shown in FIG. 1.

Figure 2:
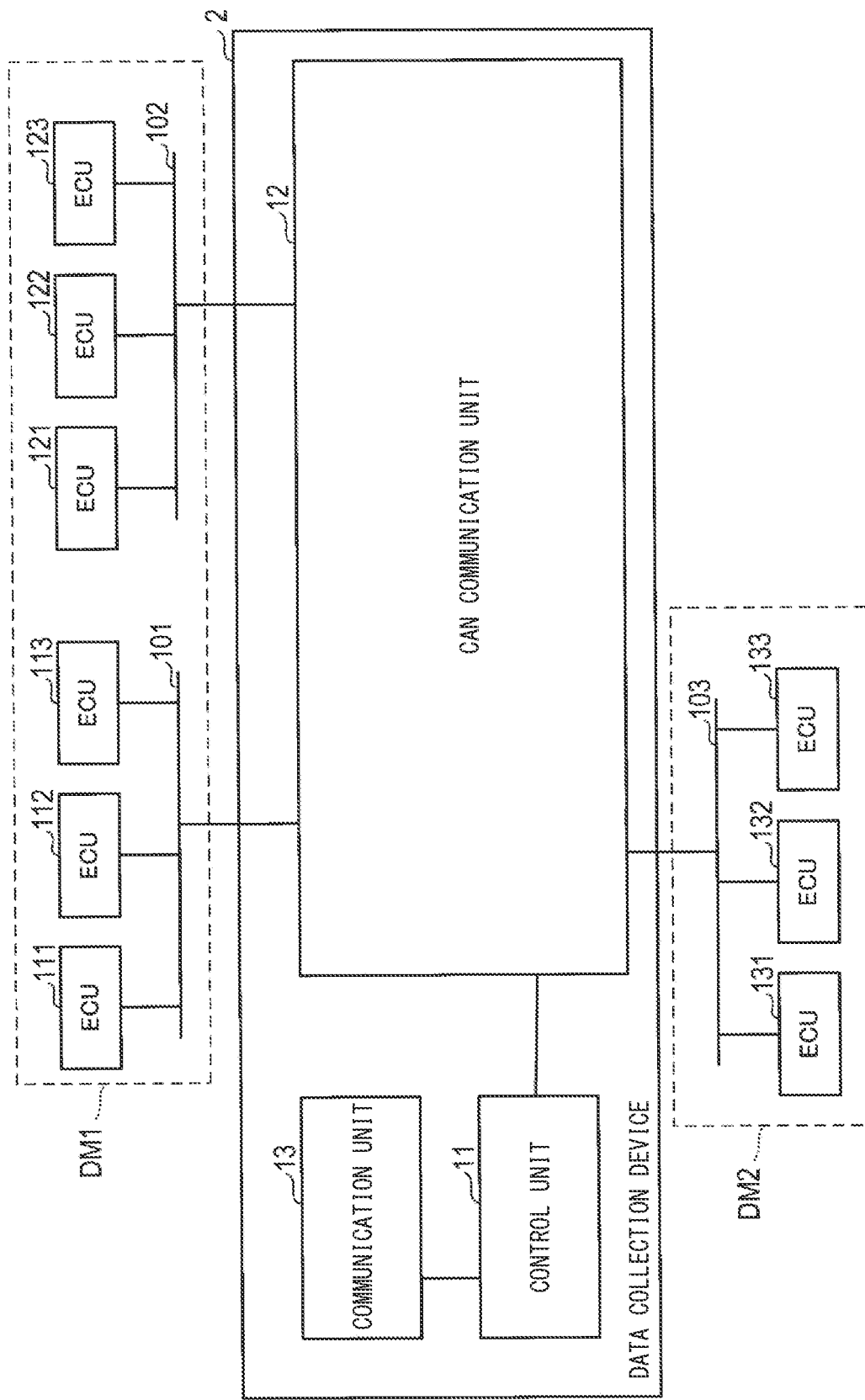
FIG. 2 is a block diagram illustrating a data collection device and multiple ECUs mounted in a vehicle manufactured by a first vehicle manufacturer.

The data collection device 2 is mounted on a vehicle and is configured to perform data communication with the vehicle data management device 3 through a wireless wide area network NW. The data collection device 2 includes a control unit 11, a CAN communication unit 12, and a communication unit 13, as shown in FIG. 2.

The control unit 11 is an electronic controller including as a main component a microcontroller having a CPU, a ROM, a RAM, and the like. CAN is an abbreviation for Controller Area Network. CAN is a registered trademark.

The CAN communication unit 12 is configured to perform data communication with multiple in-vehicle components (such as electronic controllers and sensors) mounted on the vehicle in accordance with the CAN communication protocol. The communication unit 13 is configured to perform data communication with the vehicle data management device 3 through the wireless wide area network NW.

The CAN communication unit 12 is connected with ECUs 111, 112, 113, ECUs 121, 122, 123, and ECUs 131, 132, 133, for example. ECU is an abbreviation for Electronic Control Unit.

The ECUs 111, 112, 113 and the CAN communication unit 12 are connected with each other through a communication line 101 to perform data communication with each other by transmitting and receiving data in accordance with CAN communication protocol.

The ECUs 121, 122, 123 and the CAN communication unit 12 are connected with each other through a communication line 102 to perform data communication with each other by transmitting and receiving data in accordance with CAN communication protocol.

The ECUs 131, 132, 133 and the CAN communication unit 12 are connected with each other through a communication line 103 to perform data communication with each other by transmitting and receiving data in accordance with CAN communication protocol.

The CAN network system is different for each vehicle manufacturer. However, the ECUs of the same system are arranged in the same domain network. For example, in FIG. 2, a domain DM1 including the communication lines 101, 102 and the ECUs 111, 112, 113, 121, 122, 123 is a domain for a powertrain system. A domain DM2 including the communication line 103 and the ECUs 131, 132, 133 is a domain for a body system.

Figure 3:
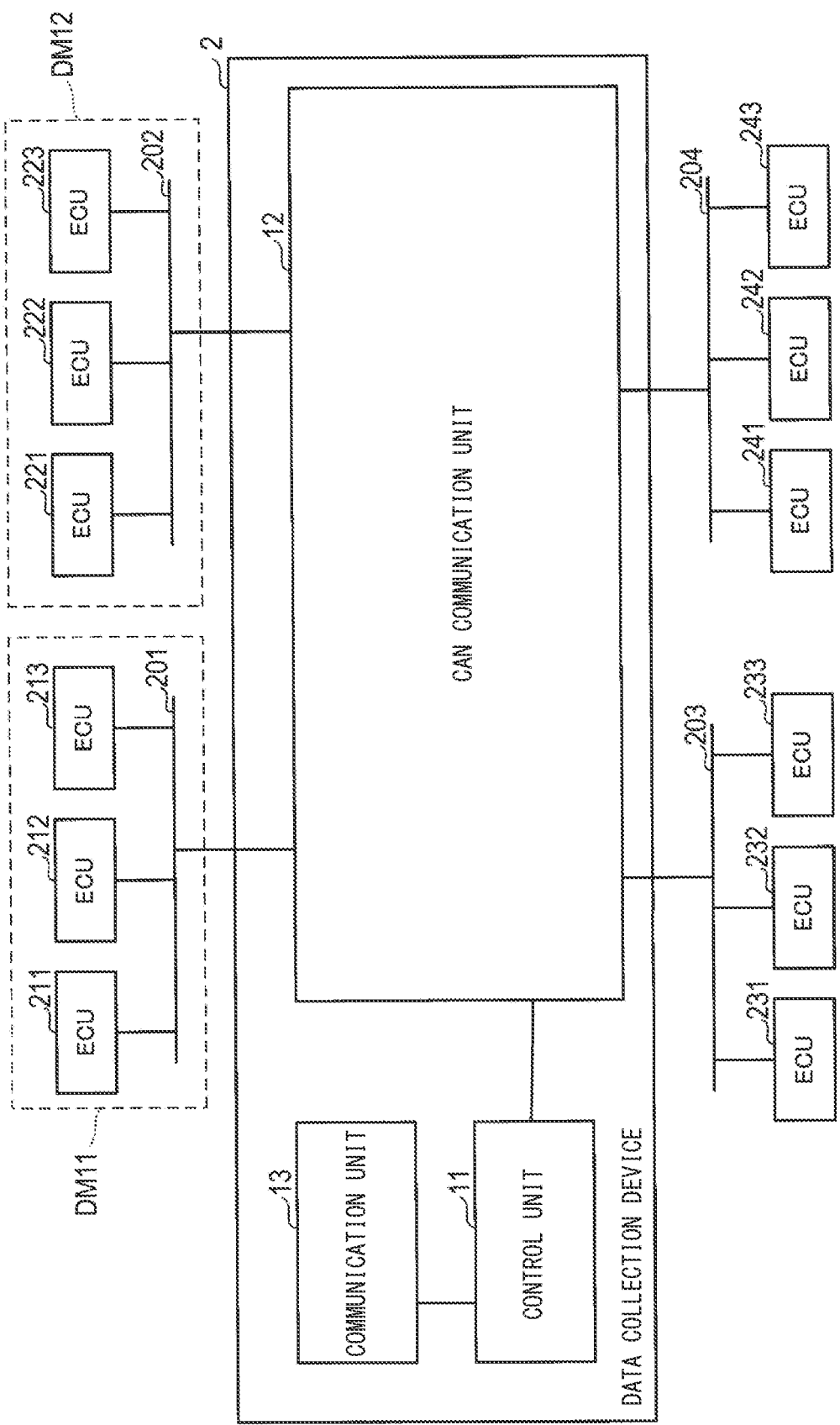
FIG. 3 is a block diagram illustrating a data collection device and multiple ECUs mounted in a vehicle manufactured by a second vehicle manufacturer.

The data collection device 2 shown in FIG. 3 is mounted on a vehicle manufactured by a vehicle manufacturer different from the vehicle manufacturer of the vehicle on which the data collection device 2 of FIG. 2 is mounted. The CAN communication unit 12 of the data collection device 2 shown in FIG. 3 is connected with ECUs 211, 212, 213, ECUs 221, 222, 223, ECUs 231, 232, 233, and ECUs 241, 242, 243.

The ECUs 211, 212, 213 and the CAN communication unit 12 are connected with each other through a communication line 201 to perform data communication with each other by transmitting and receiving data in accordance with CAN communication protocol.

The ECUs 221, 222, 223 and the CAN communication unit 12 are connected with each other through a communication line 202 to perform data communication with each other by transmitting and receiving data in accordance with CAN communication protocol.

The ECUs 231, 232, 233 and the CAN communication unit 12 are connected with each other through a communication line 203 to perform data communication with each other by transmitting and receiving data in accordance with CAN communication protocol.

The ECUs 241, 242, 243 and the CAN communication unit 12 are connected with each other through a communication line 204 to perform data communication with each other by transmitting and receiving data in accordance with CAN communication protocol.

A domain DM11 including the communication line 201 and the ECUs 211, 212, 213 is a domain for the powertrain system. A domain DM12 including the communication line 202 and the ECUs 221, 222, 223 is a domain for the body system.

Figure 4:
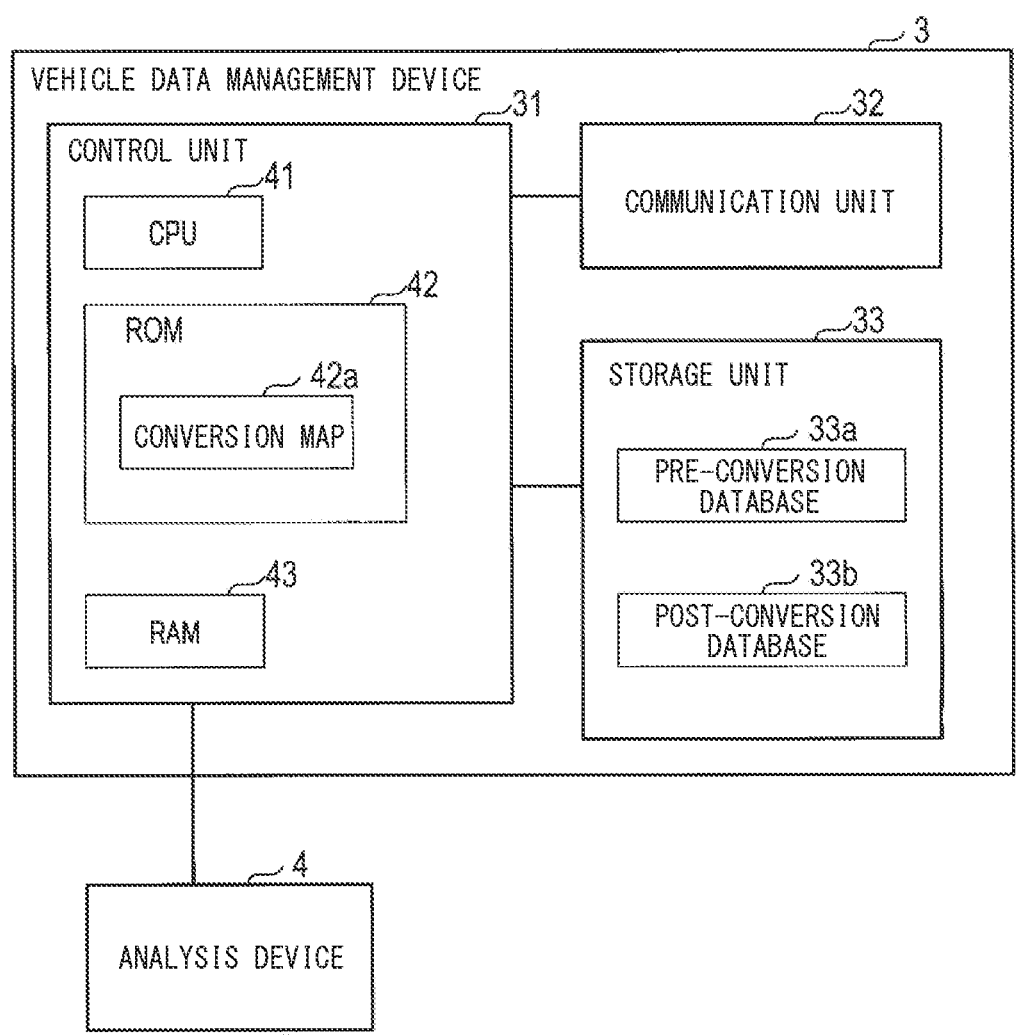
FIG. 4 is a block diagram illustrating a vehicle data management device.

Since the ECUs of the same system are arranged in the network for the same system, the differences between the vehicle manufacturers can be absorbed on the domain level. The vehicle data management device 3 includes a control unit 31, a communication unit 32, and a storage unit 33 as shown in FIG. 4.

The control unit 31 is an electronic controller including as a main component a microcontroller having a CPU 41, a ROM 42, a RAM 43, and the like. Various functions of the microcontroller are implemented by functioning the CPU 41 to execute program codes stored in a non-transitory tangible storage medium. In this example, the ROM 42 corresponds to a non-transitory tangible storage medium that stores a program. In addition, by executing this program, a method corresponding to the program is executed. Note that a part or all of the functions to be executed by the CPU 41 may be configured as hardware circuitry by one or multiple ICs or the like. The number of microcontrollers configuring the control unit 31 may be one or multiple.

The ROM 42 stores a conversion map 42a used for a data conversion process described later. The communication unit 32 is configured to perform data communication with multiple data collection devices 2 through the wireless wide area network NW.

The storage unit 33 is a memory device for storing various data. The storage unit 33 stores the pre-conversion database 33a and the post-conversion database 33b. The pre-conversion database 33a consists of vehicle data acquired from multiple data collection devices 2 through the wireless wide area network NW.

The post-conversion database 33b is obtained by converting the vehicle data in the pre-conversion database by the data conversion process described later. The control unit 31 is connected with an analysis device 4 configured to analyze the data that the vehicle data management device 3 collected from the data collection devices 2.

Figure 5:
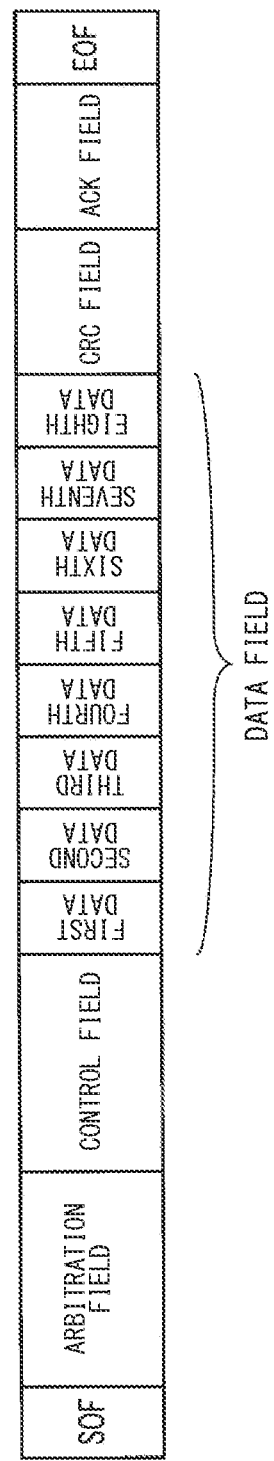
FIG. 5 is a diagram illustrating a configuration of a frame.

A CAN frame consists of a start-of-frame, arbitration field, control field, data field, CRC field, ACK field and end-of-frame, as shown in FIG. 5. The arbitration field consists of an 11-bits or 29-bits identifier (or ID) and a 1-bit RTR bit.

The 11-bits identifier used in CAN communication is called CAN ID. The CAN ID is preset based on contents of data of the CAN frame, the sender of the CAN frame, the destination of the CAN frame, and the like.

The data field includes 8-bits (i.e. 1-byte) first data, second data, third data, fourth data, fifth data, sixth data, seventh data, and eighth data.

The pre-conversion database 33a stores the CAN data in association with a vehicle ID, time, latitude, longitude, system, and CAN ID as shown in FIG. 6. The pre-conversion database 33a has a matrix structure. In the pre-conversion database 33a, the CAN data with earlier reception time has smaller row number i.

The CAN data constitutes the data field of the CAN frame. That is, the CAN data is the first to eighth data described above. The vehicle ID is an identification number specified by a model and a model year of the vehicle that transmitted the corresponding CAN frame. For example, "012" shown in FIG. 6 is the vehicle ID of the vehicle equipped with the data collection device 2 shown in FIG. 2. Further, "890" shown in FIG. 6 is the vehicle ID of the vehicle equipped with the data collection device 2 shown in FIG. 3.

The time, the latitude, and the longitude are those when the corresponding CAN frame is transmitted. The system is an information for identifying the CAN network in the vehicle that transmitted the corresponding CAN frame. For example, "CAN1" shown in FIG. 6 indicates the CAN network including the communication line 101 and the ECUs 111, 112, 113 shown in FIG. 2. "CAN2" shown in FIG. 6 indicates the CAN network including the communication line 102 and the ECUs 121, 122, 123 shown in FIG. 2. "CANa" shown in FIG. 6 indicates the CAN network including the communication line 201 and the ECUs 211, 212, 213 shown in FIG. 3. "CANb" shown in FIG. 6 indicates the CAN network including the communication line 202 and the ECUs 221, 222, 223 shown in FIG. 3.

The CAN ID is a CAN ID of the corresponding CAN frame. Next, the data conversion process executed by the control unit 31 of the vehicle data management device 3 will be described. The data conversion process is executed repeatedly during the operation of the vehicle data management device 3.

Figure 7:
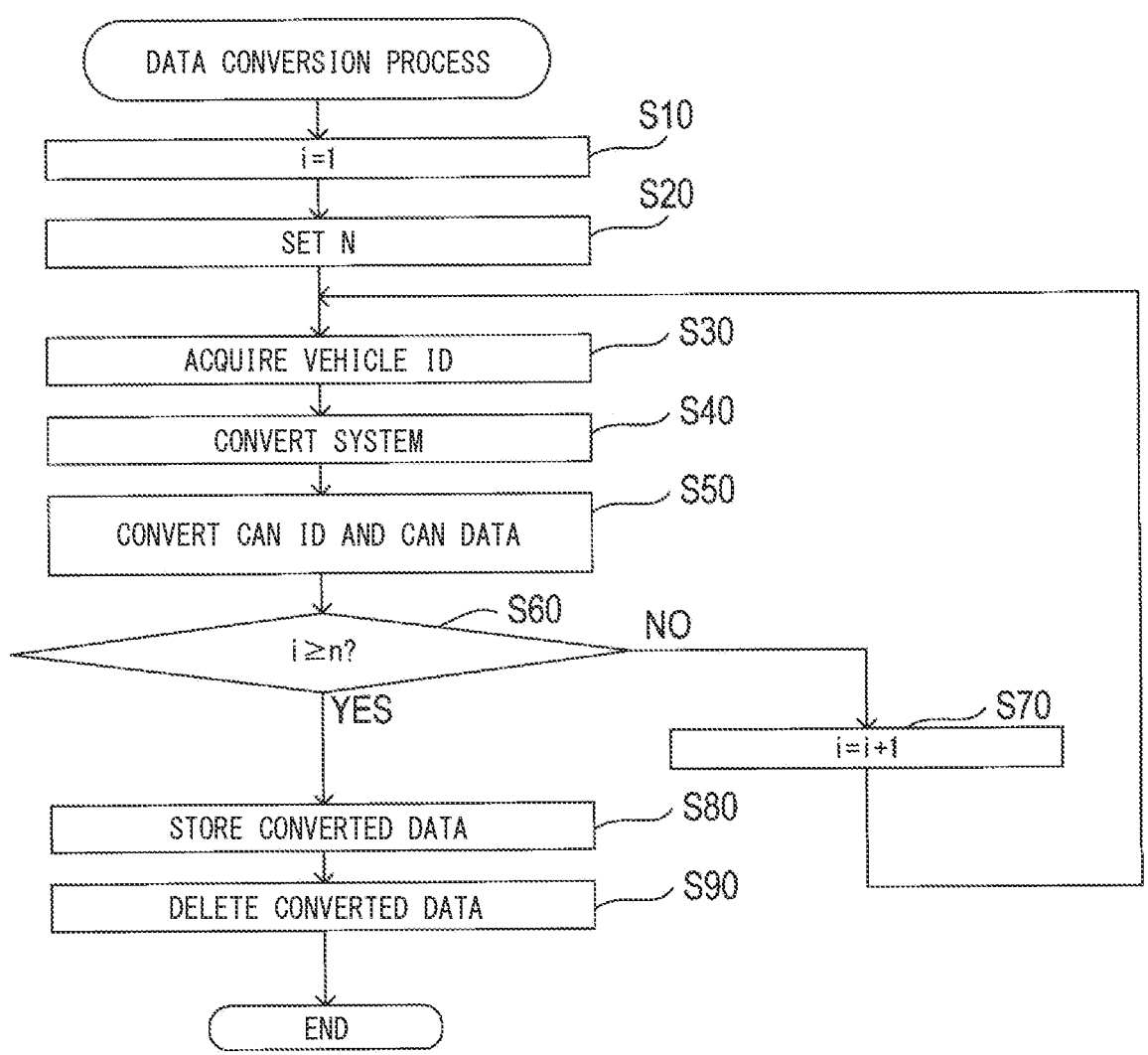
FIG. 7 is a flowchart illustrating a data conversion process.

When the data conversion process is started, the CPU 41 of the control unit 31 assigns 1 to a row number indicator value i of RAM 43 in S10, as shown in FIG. 7. In S20, the CPU 41 sets a maximum row number n of RAM 43. Specifically, the CPU 41 gets the number of the rows of the matrix of the pre-conversion database 33a and assigns the number of the rows to the maximum row number n of the RAM 43.

In S30, the CPU 41 gets from the pre-conversion database 33a the vehicle ID in the row corresponding to the row number indicator value i. For example, in FIG. 6, when the row number indictor value i is 2, the vehicle ID is "012".

Next, in S40, the CPU 41 refers to the conversion map 42a to convert the system in the row corresponding to the row number indicator value i in the pre-conversion database 33a to the domain. The conversion map 42a stores a domain identification information that indicates a correspondence between the CAN ID and the domain for each of the vehicle IDs. For example, when the vehicle ID is "012", the CAN ID of "123" is associated with the powertrain, the CAN ID of "7FE" is associated with the powertrain, and the CAN ID of "311" is associated with the body. When the vehicle ID is "890", the CAN ID of "233" is associated with the powertrain, the CAN ID of "4a1" is associated with the powertrain, and the CAN ID of "68E" is associated with the body.

In S50, the CPU 41 refers to the conversion map 42a to convert the CAN ID in the row corresponding to the row number indicator value i in the pre-conversion database 33a to the control label. Further, the CPU 41 refers to the conversion map 42a to convert the CAN data in the row corresponding to the row number indicator value i in the pre-conversion database 33a to the vehicle information.

The conversion map 42a stores one or more combinations of the control label, a bit assignment, and a conversion information for each vehicle ID. For example, when the vehicle ID is "012", a bit assignment whose CAN ID is "123" and data position is "Byte 1, Bit 0, Len 8", and a conversion information expressed by a conversion formula for converting the CAN data into the engine speed are associated with the control label of the engine speed. "Byte 1, Bit 0, Len 8" corresponds to the bits 0-7 of the first data in the data field of the CAN frame.

When the vehicle ID is "012", a bit assignment whose CAN ID is "123" and data position is "Byte 2, Bit 0, Len 3", and a conversion information expressed by a conversion formula for converting the CAN data into the accelerator open degree are associated with the control label of the accelerator open degree. "Byte 2, Bit 0, Len 3" corresponds to the bits 0-2 of the second data in the data field of the CAN frame.

When the vehicle ID is "012", a bit assignment whose CAN ID is "7FE" and data position is "Bite 2, Bit 0, Len 2", and a conversion information represented by the correspondence between the CAN data and P, R, D, S, B range or the like are associated with the control label of the shift position. "Byte 2, Bit 0, Len 3" corresponds to the bits 0, 1, 3 of the second data in the data field of the CAN frame.

When the vehicle ID is "012", a bit assignment and a conversion information represented by a correspondence between the CAN data and the high beam, the low beam and the like are associated with the control label of the headlight.

When the vehicle ID is "890", a bit assignment whose CAN ID is "233" and data position is "Byte 2, Bit 0, Len 8", and a conversion information expressed by a formula for converting the CAN data into the engine speed are associated with the control label of the engine speed. "Byte 2, Bit 0, Len 8" corresponds to the bits 0-7 of the second data in the data field of the CAN frame.

When the vehicle ID is "890", a bit assignment and a conversion information represented by a correspondence between the CAN data and P, R, D, S, B ranges are associated with the control label of the shift position.

When the vehicle ID is "890", a bit assignment and a conversion information represented by a correspondence between the CAN data and the high beam, the low beam and the like are associated with the control label of the headlight.

In S60, the CPU 41 determines whether the value stored in the row number indicator value i is equal to or greater than the value stored in the maximum row number n. When the value stored in the row number indicator value i is smaller than the value stored in the maximum row number n, the CPU 41 increments the row number indicator value i by 1 in S70, and the process returns to S30.

In contrast, when the value stored in the row number indicator value i is equal to or greater than the value stored in the maximum row number n, the CPU 41 stores, in the post-conversion database 33b, the converted data which is stored in the first to nth rows of the pre-conversion database 33a, the vehicle ID, the time, the latitude, and the longitude corresponding to the converted data such that the data converted earlier has smaller row number in S80.

In S90, the CPU 41 deletes the data in the first to nth rows of the pre-conversion database 33a (i.e. the converted data) from the pre-conversion database 33a, and thus the data conversion process ends.

The post-conversion database 33b is shown in FIG. 8, which can be obtained by converting the pre-conversion database 33a shown in FIG. 6 through the data conversion process. As shown in FIG. 8, the post-conversion database 33b stores the vehicle information, and each vehicle information is associated with the vehicle ID, the time, latitude, longitude, system, and control label. The post-conversion database 33b has a matrix structure. In FIG. 8, "4567 rpm", "50%", and "3333 rpm" are physical values, and "D-range", "high beam", and "low beam" are type values.

As described above, the vehicle data management device 3 includes the communication unit 32 and the control unit 31. The communication unit 32 is configured to acquire, from the data collection devices 2 mounted on the vehicles respectively, the vehicle ID which is set based on at least the vehicle model, and the CAN data indicative of vehicle information which is contained in the CAN frame transmitted and received in the CAN network of the vehicle.

The control unit 31 is configured to convert the CAN data into the control label and a management value for each vehicle ID based on the conversion map 42a which contains at least one of the bit assignment for identifying the control label of the CAN data and the conversion information for converting the CAN data into the physical value or the type value (hereinafter, referred to as the management value).

The bit assignment is an information indicative of a position of the CAN data in the CAN frame. The conversion information is set for each bit assignment and is indicative of a correspondence between the CAN data and the management value.

Accordingly, the vehicle data management device 3 is configured to identify the control label of each CAN data based on the bit assignment of the conversion map 42a. For example, when (i) the vehicle ID is "012", (ii) the CAN ID of the bit assignment is "123", and (iii) the data position of the bit assignment is "Byte 1, Bit 0, Len 8", the control label is "engine speed". Further, when (i) the vehicle ID is "890", (ii) the CAN ID of the bit assignment is "233", and (iii) the data position of the bit assignment is "Byte 2, Bit 0, Len 8", the control label is "engine speed". According to the vehicle data management device 3, the same control label of "engine speed" can be assigned to the CAN data whose vehicle IDs and CAN IDs are different from each other.

Accordingly, the vehicle data management device 3 is configured to classify the CAN data with different vehicle IDs into the same group by the control label. Accordingly, the vehicle data management device 3 can easily manage the database (i.e. the post-conversion database 33b) consisting of vehicle information acquired from multiple data collection devices 2.

CAN data contains the CAN ID indicative of the CAN network used for transmitting and receiving the CAN frame in which the CAN data is stored. The conversion map 42a contains the domain identification information indicative of the correspondence between the CAN ID and the domain of the vehicle. The control unit 31 is configured to identify the domain corresponding to the management value based on the domain identification information of the conversion map 42a. Accordingly, the vehicle data management device 3 is configured to classify the CAN data with different vehicle IDs into the same group based on the domain. Accordingly, the vehicle data management device 3 can easily manage the database (i.e. the post-conversion database 33b) consisting of vehicle information acquired from multiple data collection devices 2.

The control unit 31 stores at least the converted control label and management value. According to the vehicle data management device 3, the analysis device 4 can utilize the database (i.e. the post-conversion database 33b) consisting of the vehicle information acquired from multiple data collection devices 2. Since the CAN data with different vehicle IDs stored in the post-conversion database 33b can be classified based on the control label and the domain, the analysis device 4 can easily extract information required for analysis using the control label and the domain.

In the above-described embodiment, the data collection device 2 corresponds to an in-vehicle device, the communication unit 32 corresponds to a data acquisition unit, and the process in S50 corresponds to a data conversion unit. The vehicle ID corresponds to a vehicle identification information, the CAN data corresponds to a first data, the control label corresponds to a label, the management value corresponds to a second data, and the bit assignment corresponds to a label identification information.

The CAN ID corresponds to a network identification information, the process in S40 corresponds to a domain identification unit, and the process in S80 corresponds to a post-conversion data storage unit.

Second Embodiment

Hereinafter, a second embodiment of the present disclosure will be described with reference to the drawings. Note that in the second embodiment, portions different from the first embodiment is described. The same reference numerals are given to common components.

Figure 9:
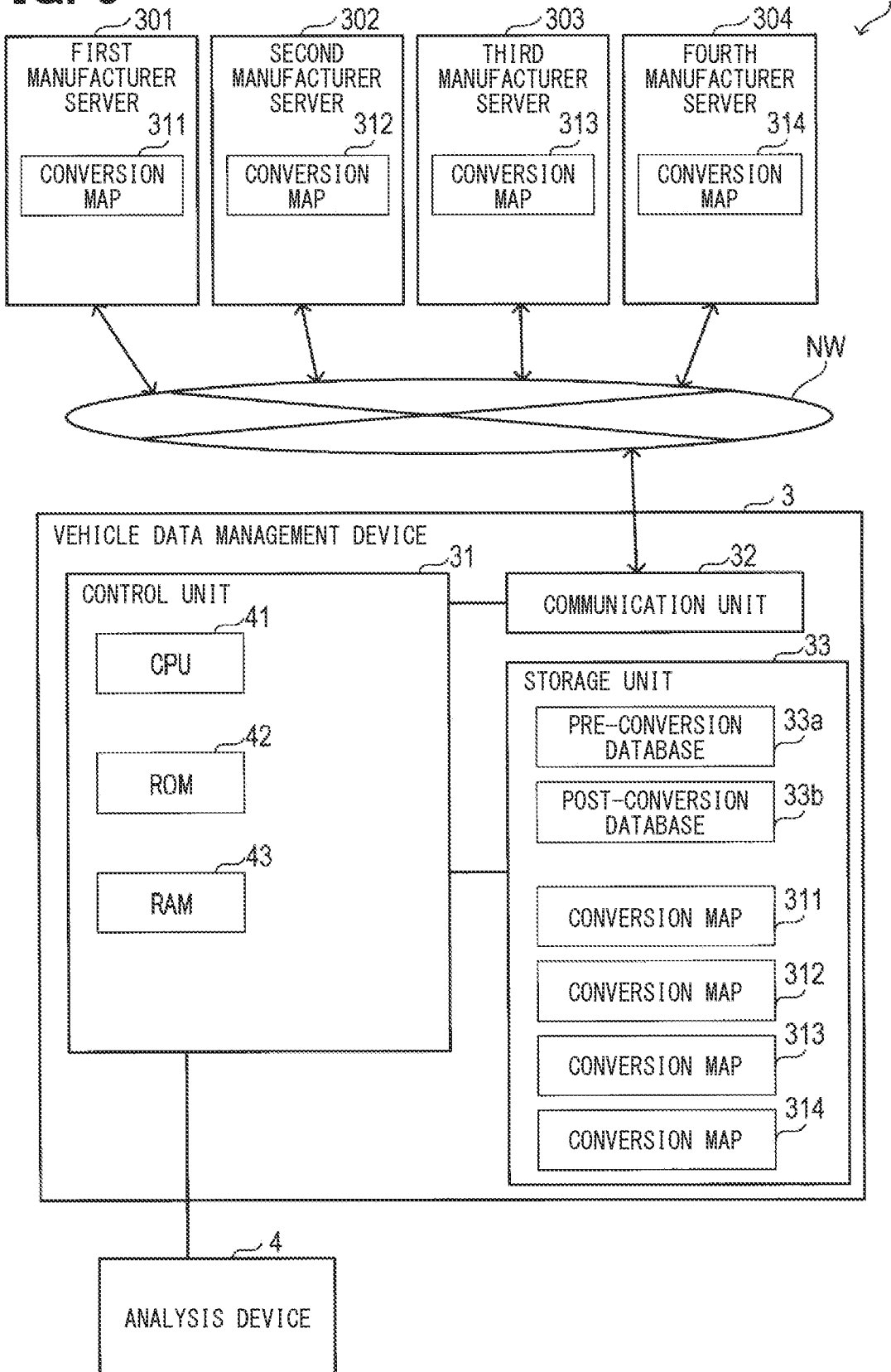
FIG. 9 is a block diagram illustrating a vehicle data management system.

As shown in FIG. 9, the vehicle data management system 1 of the second embodiment includes a first manufacturer management server 301, a second manufacturer management server 302, a third manufacturer management server 303, and a fourth manufacturer management server 304 differently from the first embodiment.

The first manufacturer management server 301, the second manufacturer management server 302, the third manufacturer management server 303, and the fourth manufacturer management server 304 perform data communication with the vehicle data management device 3 through the wireless wide area network NW.

The first manufacturer management server 301, the second manufacturer management server 302, the third manufacturer management server 303, and the fourth manufacturer management server 304 are servers managed by a first vehicle manufacturer, a second vehicle manufacturer, a third vehicle manufacturer, and a fourth vehicle manufacturer, respectively.

The first manufacturer management server 301, the second manufacturer management server 302, the third manufacturer management server 303, and the fourth manufacturer management server 304 store a first conversion map 311, a second conversion map 312, a third conversion map 313, and a fourth conversion map 314, respectively.

The first manufacturer management server 301, the second manufacturer management server 302, the third manufacturer management server 303, and the fourth manufacturer management server 304 transmit the first conversion map 311, the second conversion map 312, the third conversion map 313, and the fourth conversion map 314 to the vehicle data management device 3, respectively.

The vehicle data management device 3 stores the received first conversion map 311, the second conversion map 312, the third conversion map 313, and the fourth conversion map 314 in the storage unit 33. The conversion maps 311, 312, 313, 314 are maps each of which contains one or more combinations of the control label, the bit assignment, and the conversion information for each vehicle ID of the vehicle manufactured by the first to fourth vehicle manufacturers, respectively.

The vehicle data management device 3 is configured to convert the system of the pre-conversion database 33a by referring to the first to fourth conversion maps 311, 312, 313, 314 stored in the storage unit 33. The vehicle data management device 3 is configured to respectively convert the CAN ID and the CAN data in the pre-conversion database 33a into the control label and the vehicle information by referring to the first to fourth conversion maps 311, 312, 313, 314 stored in the storage unit 33.

The vehicle data management system 1 as described above includes the vehicle data management device 3, the first manufacturer management server 301, the second manufacturer management server 302, the third manufacturer management server 303, the fourth manufacturer management server 304, and the analysis device 4.

The vehicle data management device 3 includes the communication unit 32 and the control unit 31. The communication unit 32 is configured to acquire, from the data collection devices 2 mounted on the vehicles respectively, the vehicle ID which is set based on at least the vehicle model, and the CAN data indicative of vehicle information which is contained in the CAN frame transmitted and received in the CAN network of the vehicle.

The control unit 31 is configured to convert the CAN data into the control label and a management value for each vehicle ID based on the first to fourth conversion maps 311, 312, 313, 314 each of which contains at least one of the bit assignment for identifying the control label of the CAN data and the conversion information for converting the CAN data into the physical value or the type value (hereinafter, referred to as the management value).

The first to fourth manufacturer management servers 301, 302, 303, 304 store the first to fourth conversion maps 311, 312, 313, 314, respectively. The analysis device 4 is configured to perform the analysis using the control label and the management value converted by the vehicle data management device 3. The first to fourth manufacturer management servers 301, 302, 303, 304 and the vehicle data management device 3 are connected to perform data communication.

The vehicle data management system 1 is a system including the vehicle data management device 3, and the same effects as the vehicle data management device 3 of the first embodiment can be obtained. In the embodiment described above, the first to fourth manufacturer management servers 301, 302, 303, 304 correspond to a map storage device.

As described above, the embodiments of the present disclosure are described, but the present disclosure is not limited to the above embodiments, and can be implemented with various modifications.

MODIFIED EXAMPLE

In the above-described embodiments, "engine speed", "accelerator open degree", "shift position", and "headlight" are referred to as the control labels which are labels of data directly related to the vehicle control. However, the data managed by the vehicle data management device 3 is not limited to the data directly related to the vehicle control, and other data may be managed as long as the data can be acquired by the vehicle such as "state of driver". Accordingly, the label used in the post-conversion database 33b is not limited to the control label and may be an occupant label, for example.

The control unit 31 and method described in the present disclosure may be implemented by a special purpose computer which is configured with a memory and a processor programmed to execute one or more particular functions embodied in computer programs of the memory. Alternatively, the control unit 31 described in the present disclosure and the method thereof may be realized by a dedicated computer configured as a processor with one or more dedicated hardware logic circuits. Alternatively, the control unit 31 and method described in the present disclosure may be realized by one or more dedicated computer, which is configured as a combination of a processor and a memory, which are programmed to perform one or more functions, and a processor which is configured with one or more hardware logic circuits. Further, the computer program may be stored in a computer-readable non-transitory tangible storage medium as instructions to be executed by a computer. The technique for realizing the functions of each unit included in the control unit 31 does not necessarily need to include software, and all the functions may be realized using one or a plurality of hardware circuits.

The multiple functions of one component in the above embodiment may be realized by multiple components, or a function of one component may be realized by the multiple components. In addition, multiple functions of multiple components may be realized by one component, or a single function realized by multiple components may be realized by one component. Moreover, part of the configuration of the above-described embodiment may be omitted. Further, at least part of the configuration of the above-described embodiment may be added to or replaced with the configuration of another embodiment described above.

In addition to the vehicle data management device 3 described above, various features such as a system having the vehicle data management device 3 as a component, a program for making the computer function as the vehicle data management device 3, a non-transitory tangible storage medium such as a semiconductor memory in which the program is stored, and a method of converting data may provide to realize the present disclosure.

Additional advantages and modifications will readily occur to those skilled in the art. The disclosure in its broader terms is therefore not limited to the specific details, representative apparatus, and illustrative examples shown and described.

What is claimed is:

1. A vehicle data management device comprising:
a data acquisition unit configured to acquire, from each of
a plurality of in-vehicle devices mounted on a corresponding vehicle of a plurality of vehicles,
a vehicle identification information that is set based on at least a model of the vehicle, and
a first data that is contained in a communication frame transmitted and received in an in-vehicle network of the vehicle and is indicative of a vehicle information relating to the vehicle,
a data conversion unit configured to convert the first data into a label and a second data that is a physical value or a type value based on a conversion map that contains a label identification information for identifying the label corresponding to the first data, and a conversion information for converting the first data into the second data, wherein the conversion map contains at least one label identification information and at least one conversion information for each vehicle identification information.

2. The vehicle data management device according to claim 1, wherein
the label identification information is indicative of a position in the communication frame where the first data is stored.

3. The vehicle data management device according to claim 1, wherein
the conversion information is set for each label identification information and is indicative of a correspondence relationship between the first data and the second data.

4. The vehicle data management device according to claim 1, wherein
the first data contains a network identification information for identifying a communication network used for data transmission of the communication frame containing the first data,
the conversion map contains a domain identification information indicative of a correspondence relationship between the network identification information and a domain of the vehicle, and
the vehicle data management device further comprises:
a domain identification unit configured to identify the domain corresponding to the second data based on the domain identification information of the conversion map.

5. The vehicle data management device according to claim 1, further comprising:
a post-conversion data storage unit configured to store at least the label and the second data converted by the data conversion unit.

6. A vehicle data management system comprising:
a vehicle data management device;
at least one map storage device; and
an analysis device, wherein
the vehicle data management device includes:
a data acquisition unit configured to acquire, from each of a plurality of in-vehicle devices mounted on a corresponding vehicle of a plurality of vehicles,
a vehicle identification information that is set based on at least a model of the vehicle, and
a first data that is contained in a communication frame transmitted and received in an in-vehicle network of the vehicle and is indicative of a vehicle information relating to the vehicle; and
a data conversion unit configured to convert the first data into a label and a second data that is a physical value or a type value based on a conversion map that contains
a label identification information for identifying the label corresponding to the first data, and
a conversion information for converting the first data into the second data, wherein
the conversion map contains at least one label identification information and at least one conversion information for each vehicle identification information,
the at least one map storage device stores the conversion map,
the analysis deice is configured to analyze the vehicle using the label and the second data converted by the vehicle data management device, and
the at least one map storage device and the vehicle data management device are communicably connected with each other.

7. A method of managing vehicle data, the method comprising:
acquiring a vehicle identification information and a first data from each of a plurality of in-vehicle devices mounted on a corresponding vehicle of a plurality of vehicles, the vehicle identification information being set based on at least a model of the vehicle, the first data being indicative of a vehicle information relating to the vehicle and being contained in a communication frame transmitted and received in an in-vehicle network of the vehicle; and
converting the first data into a label and a second data that is a physical value or a type value based on a conversion map that contains a label identification information for identifying the label corresponding to the first data and a conversion information for converting the first data into the second data, the conversion map containing at least one label identification information and at least one conversion information for each vehicle identification information.

* * * * *